United States Patent
Wooldridge et al.

(10) Patent No.: US 9,275,259 B2
(45) Date of Patent: Mar. 1, 2016

(54) IN-LINE QUALITY ASSURANCE

(71) Applicant: DATACARD CORPORATION, Minnetonka, MN (US)

(72) Inventors: Cory Wooldridge, Minnetonka, MN (US); Michael Robertson, Minnetonka, MN (US); Joan Cummings, Minnetonka, MN (US); Stu Bodmer, Minnetonka, MN (US); Dean Nichols, Minnetonka, MN (US); Mike Conroy, Minnetonka, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 44 days.

(21) Appl. No.: 14/068,418

(22) Filed: Oct. 31, 2013

(65) Prior Publication Data

US 2014/0117084 A1    May 1, 2014

Related U.S. Application Data

(60) Provisional application No. 61/720,517, filed on Oct. 31, 2012.

(51) Int. Cl.
| | |
|---|---|
| G06K 7/00 | (2006.01) |
| G06K 5/00 | (2006.01) |
| G06K 7/08 | (2006.01) |
| G06K 9/03 | (2006.01) |
| G06K 17/00 | (2006.01) |

(52) U.S. Cl.
CPC ............... G06K 7/0004 (2013.01); G06K 5/00 (2013.01); G06K 7/0013 (2013.01); G06K 7/084 (2013.01); G06K 9/036 (2013.01); G06K 2017/0041 (2013.01)

(58) Field of Classification Search
CPC .................. G06K 19/005; G06K 19/0772
USPC .................. 235/380, 475, 487; 705/41
See application file for complete search history.

(56) References Cited

U.S. PATENT DOCUMENTS

| | | | |
|---|---|---|---|
| 6,131,817 A * | 10/2000 | Miller | ............ 235/475 |
| 6,182,891 B1 | 2/2001 | Furuhashi et al. | |

(Continued)

FOREIGN PATENT DOCUMENTS

| | | |
|---|---|---|
| JP | 2004-355120 | 12/2004 |
| KR | 10-2010-0004748 | 1/2010 |
| WO | 2013/002753 | 1/2013 |

OTHER PUBLICATIONS

International Search Report for PCT/US2013/067789 dated Feb. 18, 2014, 3 pages.

(Continued)

*Primary Examiner* — Allyson Trail
(74) *Attorney, Agent, or Firm* — Hamre, Schumann, Mueller & Larson, P.C.

(57) ABSTRACT

Systems and methods for verifying character(s) on a personalized document, and electronically verifying a magnetic stripe and a smartcard chip of the personalized document, are provided. A quality assurance station is located downstream of personalization stations of a document personalization system. The quality assurance station can provide automated, in-line verification and quality assurance for personalized documents. The quality assurance station integrates a vision verification sub-station, a magnetic stripe sub-station, and a smartcard sub-station.

20 Claims, 3 Drawing Sheets

(56) References Cited

U.S. PATENT DOCUMENTS

| | | |
|---|---|---|
| 6,902,107 B2 | 6/2005 | Shay et al. |
| 7,434,728 B2 | 10/2008 | Paulson et al. |
| 2001/0026631 A1* | 10/2001 | Slocum et al. ............... 382/115 |
| 2003/0183695 A1* | 10/2003 | Labrec et al. ................ 235/487 |
| 2003/0201317 A1 | 10/2003 | Shay et al. |
| 2005/0109850 A1* | 5/2005 | Jones ........................... 235/487 |
| 2006/0175395 A1 | 8/2006 | Paulson et al. |
| 2007/0075132 A1* | 4/2007 | Kean ............................ 235/380 |
| 2007/0075232 A1* | 4/2007 | Ehrenberg et al. ........ 250/231.13 |
| 2008/0152874 A1* | 6/2008 | Philips ...................... 428/195.1 |
| 2010/0332387 A1* | 12/2010 | Tanner et al. .................. 705/41 |

OTHER PUBLICATIONS

Written Opinion for PCT/US2013/067789 dated Feb. 18, 2014, 7 pages.

* cited by examiner

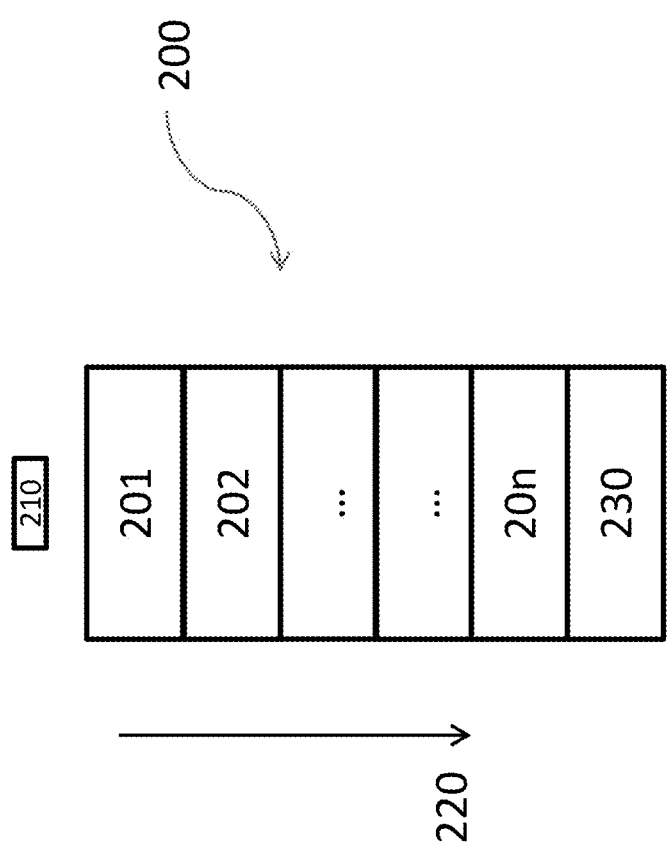

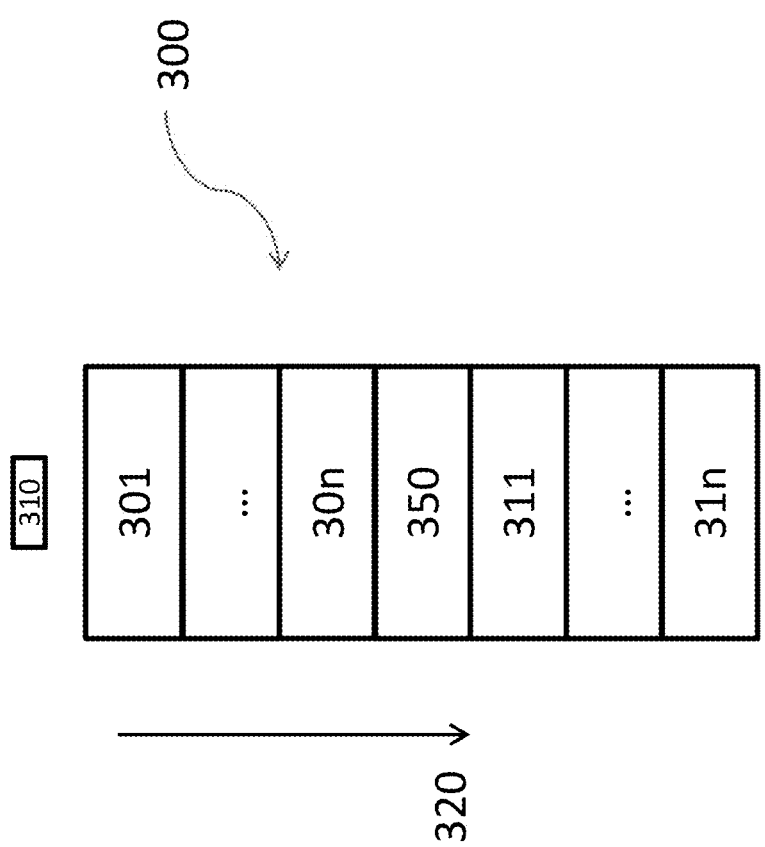

IN-LINE QUALITY ASSURANCE

This application claims the benefit of U.S. Provisional Application Ser. No. 61/720,517 filed on Oct. 31, 2012, which is incorporated by reference herein in its entirety.

FIELD OF TECHNOLOGY

The embodiments disclosed herein relate generally to machine vision verification and electronic verification, more particularly to vision verification for characters or symbols and electronic verification of a magnetic stripe, a smartcard chip, and/or data stored therein on a personalized document.

BACKGROUND

In certain applications, embossed and/or indented characters, such as lines, numbers, letters, symbols, etc., on a personalized document, e.g., a credit card, need to be verified or recognized. Prior approaches included imaging a card using a digital camera and an illumination source such as a Cloudy Day Illuminator (CDI) so that the embossed characters thereof can be verified or recognized by digitizing the image of the embossed card.

In addition, the personalized document may include a magnetic stripe and/or an embedded integrated circuit or smartcard chip for storing magnetic and/or smartcard chip data which need to be verified.

SUMMARY

The embodiments described herein relate to systems and methods for verifying character(s) on a personalized document, and/or for electronically verifying a magnetic stripe and/or a smartcard chip on the personalized document, and/or verifying magnetic data stored on the magnetic stripe, and/or verifying smartcard data stored on the smartcard chip, in a single station such as, for example, a module. The personalized document can be, for example, a credit card, an identification card, a gift card, a passport, etc.

In some embodiments, the quality assurance station described herein can be disposed at or near the end of personalization station(s) of a document personalization system for providing automated, in-line verification and quality assurance for personalized documents.

In some embodiments, a document personalization system includes one or more personalization stations, a quality assurance station, and one or more additional stations. The quality assurance station is located downstream of the personalization stations and upstream of at least one of the additional stations. The additional stations can be, for example, a reject hopper, a station that can apply one or more topcoats or laminates to a document after the document is personalized by the personalization stations of the document personalization system, or one or more stations that ready a card for mailing, such as an attachment station that attaches a card to a card carrier form, an inserting station that inserts the card/carrier combination into an envelope and/or inserts additional items into the envelope.

The embodiments described herein provide a quality assurance station that can integrate a vision verification sub-station for verifying characters on a personalized document, a magnetic stripe sub-station for verifying a magnetic stripe on the personalized document and/or verifying magnetic data recorded therein, and a smartcard sub-station for verifying a smartcard chip on the personalized document and/or verifying smartcard chip data recorded therein.

The vision verification sub-station can directly or indirectly capture one or more images of characters on a personalized document for vision verification. In one embodiment, the characters can be illuminated by one or more light sources and the images of the illuminated characters can be captured by an image capturing device such as, for example, a camera. The captured image is then used to verify and/or recognize the characters on the personalized document. In another embodiment, an image of the characters on the personalized document can be formed on a foil when applying coloration material from the foil to the characters on the personalized document. The captured image on the foil is then used to verify and/or recognize the characters on the personalized document. The characters can include, for example, embossed or indented characters, lines, numbers, letters, symbols, Braille, printed elements, laser elements, etc. The laser elements can be laser engraved elements including, for example, grayscale photos, bar codes, text, microprinting, tactile elements, etc. The laser elements can also include changeable laser images (CLI), multiple laser images (MLI) and 3D images that can be marked with a personalized document such as, for example, a card, that can be tilted at specific angles. An area marked with laser elements on the card can be smooth, for example, being raised above adjacent non-marked areas by no more than about 0.005 mm. An area marked with laser elements on the card can be tactile, for example, being raised above adjacent non-marked areas by a minimum of about 0.015 mm on at least about 70% of the laser elements.

In one embodiment, the smartcard sub-station is located at a downstream position with respect to the vision verification sub-station for verifying a smartcard chip and/or personalization data stored in the smartcard chip or an integrated circuit thereof while waiting for the vision verification sub-station to process data.

In one embodiment, a document personalization system for making a personalized document is provided. The document personalization system includes a quality assurance station configured to verify information on the personalized document and inspect quality of the personalized document. The quality assurance station includes a vision verification sub-station for verifying characters on a surface of the personalized document, a magnetic stripe sub-station for electronically verifying a magnetic stripe of the personalized document and/or data stored on the magnetic stripe, and a smartcard sub-station for electronically verifying a smartcard chip of the personalized document and/or data stored on the smartcard chip.

The vision verification sub-station, the magnetic stripe sub-station and the smartcard sub-station can be positioned in any order relative to one another in the quality assurance station. In one embodiment, the vision verification sub-station is located upstream of the magnetic stripe sub-station and the smartcard sub-station. However, other ordering of the sub-stations is possible.

In addition, not all of the sub-stations need to perform verification on a card. For example, for a card that does not have a smartcard chip, only the vision verification and magnetic stripe verification may be performed. For a card that does not have a magnetic stripe, only the vision verification and the smartcard chip verification may be performed.

Further, even though a card may have both a smartcard chip and a magnetic stripe, one may choose not to perform a particular verification. For example, one may choose not to perform vision verification while performing both magnetic stripe and smartcard chip verification.

In addition to verifying the character(s) on the personalized document and/or electronically verifying the magnetic stripe and/or verifying the magnetic data stored on the magnetic stripe and/or verifying the smartcard chip and/or verifying smartcard data stored on the smartcard chip, a verification process can be performed to verify that the characters, data on the magnetic stripe, and data on the smartcard chip are all compatible/correct. This can be done by comparing some or all of the data from the different verifications to determine that the data is consistent, for example that the cardholders name printed on the card matches the name recorded on the magnetic stripe and/or recorded on the smartcard chip.

Although magnetic stripe verification capability, smartcard chip verification capability and vision verification capability have been individually incorporated at various locations into document personalization systems in the past, incorporating all three capabilities into a single module or station downstream of the personalization stations provides a number of advantages. For example, in a document personalization system, it is known that magnetic stripe verification can occur in a magnetic stripe personalization module or station, smartcard chip verification can occur in a smartcard chip programming module or station, and a vision check module or station can be provided to check the quality of or verify embossed or printed characters. However, after these verifications occur, further personalization processing can occur on a document that can interfere with or destroy the functionality of the document. For example, embossing can unintentionally occur over the magnetic stripe or over the chip or over printed information, or laminating can occur over the magnetic strip or over a contact-type smartcard chip.

The quality assurance station or module described herein provides a final check, in one location, to make sure that all of the data is consistent and that nothing happened upstream to destroy the functionality of the personalized document.

In another embodiment, a quality assurance station for verifying information on a personalized document and inspecting quality of personalization added to the personalized document is provided. The quality assurance station includes a vision verification sub-station for verifying one or more characters on a surface of the document, a magnetic stripe sub-station for electronically verifying a magnetic stripe of the document and/or data stored on the magnetic stripe, and a smartcard sub-station for electronically verifying a smartcard chip of the document and/or data stored on the smartcard chip.

In another embodiment, a method for verifying information on a personalized document and inspect quality of the personalized document, is provided. An image of characters on a surface of the personalized document is directly or indirectly captured, followed by processing the captured image at the same time. While waiting for the image processing, the personalized document is transferred to a downstream position for electronically verifying at least one of a magnetic stripe, data stored on the magnetic stripe, a smartcard chip and/or data stored on the smartcard chip of the personalized document.

If a card fails one or more of the verifications, the card can be handled in a number of different manners. In one embodiment, a card that fails at least one of the verifications can be sent to a reject hopper. In another embodiment, a card that fails at least one of the verifications can be sent on for further processing but is tagged in the control system so it can be removed later. In another embodiment, a hybrid mode can be implemented where a card that fails certain verification(s), for example failure of one of the magnetic stripe verifications and one of the smartcard chip verifications, is sent to a reject hopper, while a card that fails the other verification(s), for example fails vision verification, is sent on for further processing but is tagged in the control system to consider whether it should be later removed.

BRIEF DESCRIPTION OF THE DRAWINGS

FIG. 2 illustrates a schematic diagram of a document personalization system having a quality assurance station located at the end thereof, according to one embodiment.

FIG. 3 illustrates a schematic diagram of a document personalization system having a quality assurance station, according to another embodiment.

DETAILED DESCRIPTION

Figure 1:
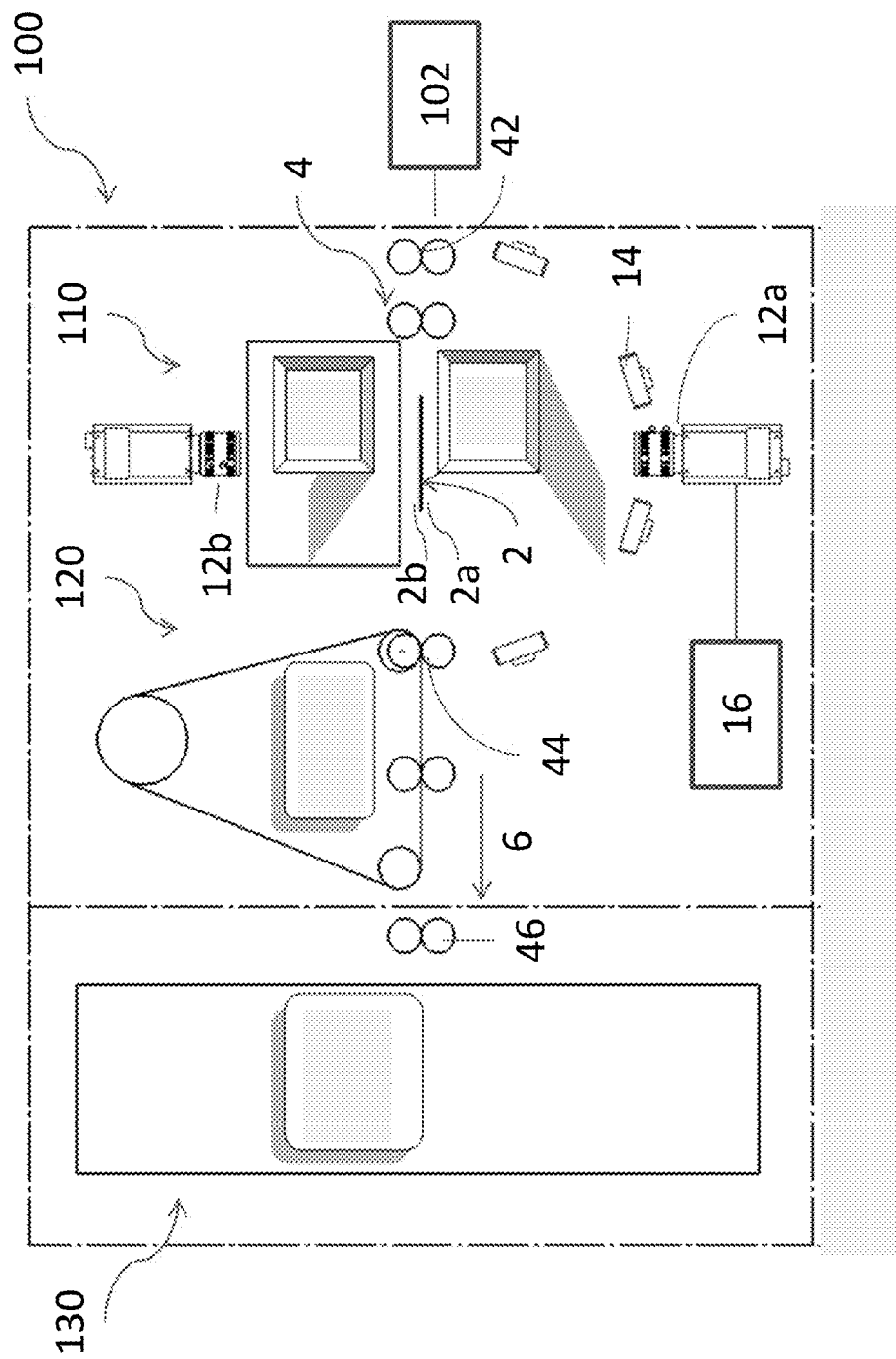
FIG. 1 illustrates a schematic view of a quality assurance station, according to one embodiment.

The embodiments described herein relate to systems and methods for verifying character(s) on a personalized document, and electronically verifying a magnetic stripe, a smartcard chip, and/or magnetic data and smartcard data stored therein on the personalized document. The personalized document can be, for example, a credit card, an identification card, a gift card, a passport, etc.

In some embodiments, a quality assurance station can be located at an end of a document personalization system and configured to provide vision verification and electronic verification.

In some embodiments, a quality assurance station can be located downstream of personalization station(s) of a document personalization system, and upstream of additional station(s) of the document personalization system. The additional station(s) can be, for example, a station that can apply one or more topcoats or laminates to the document after the document is personalized by the personalization station(s) of the document personalization system, and/or one or more stations that ready a document such as a card for mailing, such as an attachment station that attaches the document to a document carrier form, an inserting station that inserts the document/carrier combination into an envelope and/or inserts additional items into the envelope.

A quality assurance station described herein can integrate a vision verification sub-station for verifying characters on a personalized document, a magnetic stripe sub-station for verifying a magnetic stripe and/or magnetic data recorded therein on the personalized document, and a smartcard sub-station for verifying a smartcard chip and smartcard chip data recorded therein. The smartcard chip can be, for example, a contact or contactless integrated circuit chip.

A quality assurance station described herein can be disposed at or near an end of personalization station(s) of a modular or non-modular document processing system for providing automated, in-line verification and quality assurance for personalized documents.

References are made to the accompanying drawings that form a part hereof, and in which is shown by way of illustration of the embodiments in which the methods and systems described herein may be practiced. The term "personalized document" generally refers to a document having a surface with character(s) thereon that can be directly or indirectly captured and recorded in an image. In one embodiment, the personalized document can be a card such as, for example, a credit card. The card can include a card substrate made of, for example, a plastic material or other suitable materials. The card can also or alternatively include characters on a surface of the card. When embossing a character, a coloration material can be transferred from a foil onto the character. The card can also include printed material, a hologram(s), a magnetic stripe, an integrated circuit chip, etc. The term "character" refers to a feature on a surface of a personalized document, an image of which can be captured for verification or recognition. The character includes, for example, embossed characters, indented characters, printed elements, laser elements, lines, numbers, letters, symbols, Braille, etc.

FIG. 1 illustrates a schematic view of a quality assurance station 100 for verifying information on a personalized document and inspecting quality of the personalized document, according to one embodiment. The quality assurance station 100 includes a vision verification sub-station 110 for verifying characters on the personalized document, a magnetic stripe sub-station 120 for verifying a magnetic stripe on the personalized document and/or magnetic data recorded therein, and a smartcard sub-station 130 for verifying a smartcard chip on the personalized document and/or smartcard chip data recorded therein. The personalized document can be, for example, a card 2.

The quality assurance station 100 further includes a card-transfer mechanism 4 for transferring the card 2 along a direction indicated by an arrow 6. The card 2 can include features including, for example, characters, a magnetic strip, an embedded integrate circuit or smartcard chip, etc., on a front surface 2a, a back surface 2b, or embedded in the thickness thereof. The features of the card 2 can be verified and inspected by the quality assurance station 100. The characters include, for example, embossed characters, symbols, Braille, indented characters, printed elements, laser elements, etc. The magnetic strip can store magnetic data therein. The smartcard chip can store smartcard chip data therein that can include, for example, personal information such as name and personal account number, basic access control data, machine readable zone data, etc.

The quality assurance station 100 can be a portion of a card personalization system and can be located downstream of personalization stations of the card personalization system. The card-transfer mechanism 4 includes an inlet 42 for receiving the card 2 from an upstream station 102 of the card personalization system. One embodiment of the card personalization system is described in U.S. Pat. No. 6,902,107, which is incorporated herein by reference in its entirety.

In some embodiments, the quality assurance station can be connected to or integrated with desktop card processing equipment such as, for example, the desktop card processing equipment described in U.S. Pat. No. 7,434,728, which is incorporated herein by reference in its entirety. It is to be understood that the card-transfer mechanism 4 can be reversible. That is, the card 2 can be transferred into the station 100 in the direction of the arrow 6, as well as being reversed in direction opposite the direction of the arrow 6 and out the inlets 46, 44, and 42 sequentially back to the upstream station 102. In one embodiment, when the quality assurance station 100 is connected to or integrated with desktop card processing equipment, a personalized document from the desktop card processing equipment can be transferred to the quality assurance station 100 via the inlet 42 for verification and/or quality inspection. After the verification, the personalized document can be transferred back to the desktop card processing equipment via the inlet 42 and the personalized document can be collected for customer use.

In some embodiments, the card-transfer mechanism 4 is irreversible and the card 2 is transferred downstream in the direction of the arrow 6 only.

The vision verification sub-station 110, the magnetic stripe sub-station 120 and the smartcard sub-station 130 can be positioned in any order relative to one another in the quality assurance station. In the illustrated embodiment, the vision verification sub-station 110 is disposed at an upstream position with respect to the magnetic stripe sub-station 120 and the smartcard sub-station 130, and receives the card 2 from the inlet 42. The vision verification sub-station 110 includes one or more image capturing device such as, for example, cameras 12a and 12b for directly or indirectly capturing one or more images of the front surface 2a and/or the back surface 2b of the card 2a and the characters thereon, and a light source 14 for illuminating the surface of the card.

In some embodiments, one or more images of the front surface 2a and/or the back surface 2b of the card 2 can be directly captured by the cameras 12a and/or 12b. The characters on the surfaces 2a, 2b of the card 2 can be illuminated by the light source 14 and images can be taken for the illuminated surfaces 2a, 2b and the characters thereon. In the illustrated embodiments, the cameras 12a-b are used for capturing images of the front and back surfaces 2a-b, respectively. In other embodiments, one camera such as the camera 12a can be used, and the card 2 can be flipped for capturing images on both the front and back surfaces 2a and 2b using the camera 12a. The captured images can then be combined and used to verify and/or recognize the characters on the card 2.

In some embodiments, the images of the characters on the card 2 can be indirectly read and verified. For example, an image of embossed characters on the front or back surfaces 2a, 2b of the card 2 can be formed on a foil (not shown) when applying coloration material from the foil to the characters on the personalized document. Then the camera 12 can capture the formed image on the foil when the foil is illuminated by the light source 14 as a backlight source or front light source. The captured image on the foil can then be used to verify and/or recognize the embossed characters on the card 2. One can refer to International Application No. PCT/US2011/041968 (Publication No. WO 2013/002753) to Peter Johnson, entitled "TOPPING FOIL VISION VERIFICATION SYSTEM," for a detailed description of capturing an image on a foil, which is incorporated herein by reference in its entirety.

The directly or indirectly captured images can be sent from the camera 12 to a processor 16 connected to the camera 12 for verification and/or recognition. The processor 16 is integrated with the quality assurance station 100. It is to be understood that the processor 16 can be separate from the quality assurance station 100. In some embodiments, a combination of two or more images can be captured for verifying the characters on the surfaces 2a and 2b of the card 2. The captured images can be processed by the processor 16 for determining and analyzing location and spacing of the characters to tell whether they meet standards such as, for example, the ISO 7811 standard. It may take a period of time, for example, several seconds, for the processor to process the captured images for vision verification and/or recognition.

During the period of time for the processor 16 to process the captured images, the card 2 can be transferred from the vision verification sub-station 110 to the magnetic stripe sub-station 120 via an inlet 44 for verifying the magnetic stripe and/or the magnetic data thereon, and from the magnetic stripe sub-station 120 to the smartcard sub-station 130 via an inlet 46 for verifying the smartcard chip and/or the smartcard chip data thereon.

The magnetic stripe sub-station 120 includes a reader and associated firmware for reading the magnetic stripe on the card 2 to determine whether the magnetic stripe can be read or works (i.e. is operable), and if the magnetic stripe works, electronically verifying the magnetic data stored therein. The magnetic strip sub-station can be a magnetic stripe module that is known in the art.

The smartcard sub-station 130 includes a reader and associated firmware for reading the smartcard chip on the card 2 to determine whether the smartcard chip can be read or works (i.e. is operable), and if the smartcard chip works, electronically verifying the smartcard chip data stored therein. The smartcard sub-station 130 can include one or more stations, each of which is capable of receiving a card and performing verification. The smartcard sub-station can be a smartcard verification module that is known in the art.

The magnetic stripe sub-station 120 and the smartcard sub-station 130 can be located downstream of the vision verification sub-station 110 and can act as a buffer for the vision verification sub-station 110. That is, the magnetic stripe, the magnetic stripe data, the smartcard chip and the smartcard chip data of the card 2 can be electronically verified in the magnetic stripe sub-station 120 and the smartcard sub-station 130 while waiting for the processor 16 to process the image data sent from the camera 12 of the vision verification sub-station 110. This arrangement can increase efficiency and provide a smooth in-line verification process to ensure data integrity and card quality.

Not all of the sub-stations 110, 120, 130 need to perform verification. For example, for a card that does not have a smartcard chip, only the vision verification by the sub-station 110 and magnetic stripe verification by the sub-station 120 may be performed. For a card that does not have a magnetic stripe, only the vision verification by the sub-station 110 and the smartcard chip verification by the sub-station 130 may be performed.

Further, even though a card may have both a smartcard chip and a magnetic stripe, one may choose not to perform a particular verification. For example, one may choose not to perform vision verification while performing both magnetic stripe and smartcard chip verification.

After the magnetic stripe sub-station 120 and the smartcard sub-station 130 verify the magnetic strip, the smartcard chip, and the magnetic data and the smartcard chip data thereof, and the processor 16 verifies the images, the quality assurance station 100 can determine whether the information on the card 2 is correct and whether the card 2 meets standards such as the ISO 7811 standards. Qualified or acceptable personalized documents from the quality assurance station 100 are ready for use without further processing.

In addition to verifying the character(s) on the personalized document and/or electronically verifying the magnetic stripe and/or verifying the magnetic data stored on the magnetic stripe and/or verifying the smartcard chip and/or verifying smartcard data stored on the smartcard chip, a verification process can be performed to verify that the characters, data on the magnetic stripe, and data on the smartcard chip are all compatible/correct with respect to one another. This can be done by sending all of the data from the sub-stations 110, 120, 130 to the processor 16 or other processor(s) and using the processor to compare some or all of the data from the different verifications to determine that the data is consistent. For example, one can confirm that the cardholders name printed on the card matches the name recorded on the magnetic stripe and/or recorded on the smartcard chip.

The quality assurance station 100 described herein provides a final check, in one location, to make sure that all of the data is consistent and that nothing happened upstream during personalization to destroy the functionality of the personalized document. The quality assurance station 100 can be used by itself without any conventional upstream verification, or it can be used in combination with conventional upstream verification.

Alternatively, additional processing can be performed on the acceptable personalized documents. The additional processes can include, for example, applying one or more topcoats or laminates to the documents, and/or ready the documents for mailing, such as an attachment station that attaches the documents to document carrier forms, an inserting station that inserts the document/carrier combinations into envelopes and/or inserts additional items into the envelopes.

Unacceptable personalized documents, i.e. those documents that fail one or more verifications discussed above, can be handled in a number of different manners such as collected for rejection or modification or remaking of the failed document. For example, in one embodiment, a card that fails at least one of the verifications can be sent to a reject hopper 230 (shown in FIG. 2) and a new card can be made in its place. In another embodiment, a card that fails at least one of the verifications can be sent on for further processing but is tagged in the system controller so a decision can be made whether to remove it. In another embodiment, a hybrid mode can be implemented where a card that fails certain verification(s), for example failure of one of the magnetic stripe verifications and one of the smartcard chip verifications, is sent to a reject hopper, while a card that fails the other verification(s), for example fails vision verification, is sent on for further processing but is tagged in the system controller for possible later removal.

The reject hopper 230 can be located at any suitable location relative to the quality assurance station 100 so as to be able to receive unacceptable or failed cards. Examples of suitable reject hopper locations are discussed below with respect to FIGS. 2 and 3.

FIG. 2 illustrates one embodiment of a document personalization system 200 for personalizing a document 210, according to one embodiment. The document personalization system 200 includes more than one stations 201, 202 . . . 20n connected with each other, where n is an integer greater than 1. The document 210 is personalized by the document personalization system 200 through the stations 201, 202 . . . 20n along a direction indicated by an arrow 220. In this embodiment, the station 20n near the end of the document personalization system 200 is a quality assurance station such as, for example, the quality assurance station 100. The reject hopper 230 follows the station 20n So in this embodiment, the quality assurance station 20n is located near the end of the document personalization system 200 and other than the reject hopper, there is no other station(s) of the document personalization system 200 located downstream of the quality assurance station 20n. The quality assurance station 20n includes an outlet for collecting the personalized document, and the same outlet or a different outlet can be used to direct documents to the reject hopper 230.

FIG. 3 illustrates another embodiment of a document personalization system 300 for personalizing a document 310, according to another embodiment. The document personalization system 300 includes at least one personalization station 301, 302 . . . 30n, a quality assurance station 350, and at least one additional station 311, 312 . . . 31n, where n is an integer no less than 1. The document 310 can be personalized by the document personalization system 300 through the personalization stations 301, 302 . . . 30n along a direction indicated by an arrow 320. The quality assurance station 350 is located at the end of the personalization stations 301, 302 . . . 30n. The quality assurance station 350 can be, for example, the quality assurance station 100. The additional station 311, 312 . . . 31*n* is located downstream of the quality assurance station 350, and can include the reject hopper.

It is to be understood that one or more of the additional station 311, 312 . . . 31*n* can be located upstream of the quality assurance station 350. The additional station(s) 311, 312 . . . 31*n* can be, for example, a station that can further process the document 310 including, for example, applying one or more topcoats or laminates to the document 310, or readies the document for mailing after the document 310 is personalized by the personalization stations 301, 302 . . . 30*n* and verified by the quality assurance station 350. The quality assurance station 350 can include an inlet such as, for example, the inlet 42 in FIG. 1, to receive the document 310 from an upstream personalization station such as, for example, the personalization station 30*n*. The quality assurance station 350 can also include an outlet for directing the qualified, personalized document to a downstream additional station such as, for example, the additional station 311 to further process the personalized document.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A plastic card personalization system, comprising:
a quality assurance station configured to perform a verification process on the plastic card after the plastic card has been personalized, the quality assurance station including:
    a vision verification sub-station for verifying one or more characters on a surface of the plastic card;
    a magnetic stripe sub-station that verifies data stored on a magnetic stripe of the plastic card; and
    a smartcard sub-station for electronically verifying a smartcard chip of the plastic card and/or verifying data stored on the smartcard chip;
    the vision verification sub-station is located upstream of the smartcard sub-station.

2. The plastic card personalization system of claim 1, wherein the vision verification sub-station is located upstream of the magnetic stripe sub-station.

3. The plastic card personalization system of claim 1, wherein the vision verification sub-station directly captures an image of the surface of the plastic card.

4. The plastic card personalization system of claim 1, wherein the characters include at least one of an embossed character, a symbol, a Braille character, an indented character, a printed character, and a laser produced character.

5. The plastic card personalization system of claim 1, further comprising one or more personalization stations configured to personalize the plastic card and one or more additional stations configured to further process the plastic card, wherein the quality assurance station is located downstream of the personalization stations and upstream of at least one of the additional stations.

6. The plastic card personalization system of claim 1, wherein the magnetic stripe sub-station is configured to read the magnetic stripe to electronically verify data stored on the magnetic stripe.

7. The plastic card personalization system of claim 1, wherein the smartcard sub-station is configured to determine whether the smartcard chip operates correctly and read the smartcard chip to electronically verify data stored on the smartcard chip.

8. The plastic card personalization system of claim 1, further comprising a reject hopper.

9. The plastic card personalization system of claim 1, further comprising a processor connected to the vision verification sub-station, the magnetic stripe sub-station, and the smartcard sub-station; and the processor is configured to compare at least some of the character data from the vision verification sub-station, data from the magnetic stripe, and data from the smartcard chip.

10. A quality assurance station configured to perform a verification process on a personalized plastic card after the plastic card has been personalized, the quality assurance station comprising:
    a vision verification sub-station for verifying one or more characters on a surface of the plastic card;
    a magnetic stripe sub-station that verifies data stored on a magnetic stripe of the plastic card; and
    a smartcard sub-station for electronically verifying a smartcard chip of the plastic card and/or verifying data stored on the smartcard chip;
    the vision verification sub-station is located upstream of the smartcard sub-station.

11. The quality assurance station of claim 10, wherein the vision verification sub-station is located upstream of the magnetic stripe sub-station.

12. The quality assurance station of claim 10, wherein the vision verification sub-station directly captures an image of the surface of the personalized plastic card.

13. The quality assurance station of claim 10, wherein the characters include at least one of an embossed character, a symbol, a Braille character, an indented character, a printed character, and a laser produced character.

14. The quality assurance station of claim 10, wherein the magnetic stripe sub-station is configured to read the magnetic stripe to electronically verify data stored on the magnetic stripe.

15. The quality assurance station of claim 10, wherein the smartcard sub-station is configured to determine whether the smartcard chip operates correctly and read the smartcard chip to electronically verify data stored on the smartcard chip.

16. The quality assurance station of claim 10, further comprising a processor connected to the vision verification sub-station, the magnetic stripe sub-station, and the smartcard sub-station; and the processor is configured to compare at least some of the character data from the vision verification sub-station, data from the magnetic stripe, and data from the smartcard chip.

17. A method of performing a verification process on a personalized plastic card and inspect quality of the personalized plastic card, comprising:
    directly or indirectly capturing an image of one or more characters on a surface of the personalized plastic card, followed by processing the captured image to verify the characters; and
    electronically verifying:
        data stored on a magnetic stripe of the plastic card; and
        a smartcard chip on the plastic card and/or data stored on the smartcard chip;
    wherein capturing the image occurs prior to electronically verifying the smartcard chip and/or data stored on the smart card chip.

18. The method of claim 17, wherein verifying the smartcard chip includes determining whether the smartcard chip operates correctly, and if the smartcard chip operates correctly, reading the smartcard chip to verify data stored on the smartcard chip.

19. The method of claim 17, wherein verifying the data stored on the magnetic stripe comprises reading the magnetic stripe to verify the data stored on the magnetic stripe.

20. The method of claim 17, further comprising using a computer processor to compare at least some of the characters with data from the magnetic stripe and/or data from the smartcard chip.

* * * * *